United States Patent [19] [11] 4,057,187
Cranston et al. [45] Nov. 8, 1977

[54] JOINING WIRE-LIKE MEMBERS

[75] Inventors: Benjamin Howell Cranston, Hamilton Township, Mercer County; Gary Evan Kleinedler, Hopewell Township, Mercer County; Donald Arthur Machusak, Hopewell Borough, Mercer County, all of N.J.; Charles Augustus Wiechard, Tucker, Ga.

[73] Assignee: Western Electric Company, Inc., New York, N.Y.

[21] Appl. No.: 620,609

[22] Filed: Oct. 8, 1975

Related U.S. Application Data

[63] Continuation of Ser. No. 527,786, Nov. 27, 1974, abandoned.

[51] Int. Cl.² .................. H02R 43/02; B23K 19/00
[52] U.S. Cl. ................................ 228/107; 29/628; 228/2.5; 174/94 R
[58] Field of Search ............... 29/421 E, 628; 339/276 E; 174/94 R; 228/107, 108, 109, 2.5

[56] References Cited

U.S. PATENT DOCUMENTS

| 3,364,304 | 1/1968 | Modrey | 339/276 E |
| 3,535,767 | 10/1970 | Doherty et al. | 228/107 |
| 3,624,271 | 11/1971 | Wittmann | 339/276 E X |
| 3,780,927 | 12/1973 | Kudinov et al. | 228/2.5 |
| 3,820,229 | 6/1974 | Larker et al. | 228/107 |
| 3,868,762 | 3/1975 | Nilsson | 228/109 |
| 3,875,326 | 4/1975 | Hofer | 228/107 X |
| 3,878,317 | 4/1975 | Plaskon | 29/628 X |
| 3,899,825 | 8/1975 | Hofer | 228/2.5 X |
| 3,908,267 | 9/1975 | Loyd et al. | 29/628 X |

OTHER PUBLICATIONS

Cowan, G. R. and Holtzman, A. H., Journal of Applied Physics, vol. 34, No. 4 (Part 1), pp. 928-939, Apr. 1963.

Primary Examiner—James L. Jones, Jr.
Assistant Examiner—K. J. Ramsey
Attorney, Agent, or Firm—J. Rosenstock

[57] ABSTRACT

A device for use in joining wires such as electrical conductors is disclosed. The device comprises a ferrule, the exterior surface of which is covered with a coat or layer comprising an explosive composition. The method of joining includes coaxially aligning the end portions of two wires within the ferrule and then detonating the explosive composition to produce a metallurgical bond between the ferrule and each wire end. Apparatus for forming the novel splice is also disclosed.

12 Claims, 8 Drawing Figures

JOINING WIRE-LIKE MEMBERS

This is a continuation, of application Ser. No. 527,786 filed Nov. 27, 1974, and now abandoned.

BACKGROUND OF THE INVENTION

1. Field of the Invention

This invention relates to joining wire-like members, and more particularly to methods and apparatus for joining wires by explosively forming metallurgical bonds between the end portions thereof and a ferrule.

2. Description of the Prior Art

The physical and electrical integrity of conductor joints or splices is a matter of widespread concern in the electrical industry. In a cable manufacturing facility, for example, conductor wires are sometimes spliced by a high-temperature joining process such as brazing. The wires adjacent the joint are weakened due to annealing, however, and brazing has the disadvantage of being time consuming and requiring skilled operators.

It has long been known to employ explosive techniques for joining metal parts. Thus, explosives have been used to accelerate one workpiece against another to form composite structures such as bi-metallic or clad stock; see, for example, U.S. Pat. No. 3,360,848. In such applications, relatively large quantities of a secondary explosive, shock detonated by a more sensitive primary explosive, are employed to violently deflect the large masses involved.

It was discovered more recently, as revealed in U.S. Pat. No. 3,727,296, that the more readily detonatable primary explosives could be employed directly in bonding miniature planar members, such as the metallic leads extending from an integrated circuit chip, to an opposed, flat surface.

Finally, crimping arrangements such as that shown in U.S. Pat. No. 3,542,276 are known, in which an explosive is used to create a mechanical union between two overlapped conductor wires and a third, sleeve member.

The exemplified prior art fails to disclose a method and apparatus which will provide reliably strong and electrically integral metallurgical joints suitable for the geometries and working conditions encountered in the wirejoining art.

SUMMARY OF THE INVENTION

The foregoing problem is solved in accordance with the present invention which comprises, in one aspect thereof a method of joining first and second wire-like metallic members, comprising juxtaposing the end portions of said members in approximate coaxial alignment within a third, hollow metallic member; and propelling said third member against said aligned first and second members to form metallurgical bonds therewith.

In accordance with another aspect to the invention, there is provided a device for joining two wire-like members, comprising a metallic ferrule of generally cylindrical shape having an internal passage adapted to receive the wires to be joined in approximately coaxial juxtaposition, the cross-section area of the ferrule passage being slightly greater than the cross-sectional area of the wires to be joined; and a coating of explosive material comprising a primary explosive composition on the external surface of the ferrule.

In accordance with still another aspect of the invention, there is provided a wire splice comprising a pair of wires having end portions positioned in coaxial alignment, and a metallic ferrule uniting and forming a metallurgical bond with each of said wire ends.

In accordance with yet another aspect of the invention, there is provided apparatus for joining two wires having end portions juxtaposed within an explosive-coated ferrule to form a splice assembly, comprising an enclosure having an opening for said splice assembly; detonation means mounted within said enclosure; and means mounted to said enclosure for closing said enclosure opening and holding said splice proximate said detonation means, said closing and holding means comprising a door assembly mounted on said enclosure and adapted to close said enclosure opening and form a seal about said wires.

BRIEF DESCRIPTION OF THE DRAWINGS

These and other aspects of the present invention will be readily understood from the following detailed description of specific embodiments thereof when read in conjunction with the appended drawings, in which.

DETAILED DESCRIPTION

The present invention has been described primarily in the context of explosively bonding or splicing pairs of copper, beryllium-copper, aluminum or steel wires using a splicing sleeve or ferrule comprising one of these metals or brass. Reference to these particular metals is exemplary only. It will be apparent that the inventive concept described is applicable to explosively joining pairs of wire-like members, conductive or non-conductive, which may comprise the same or different metallic elements or alloys, and that the ferrule may or may not comprise the same material as either wire.

Figures 1, 1A, 2, 3:
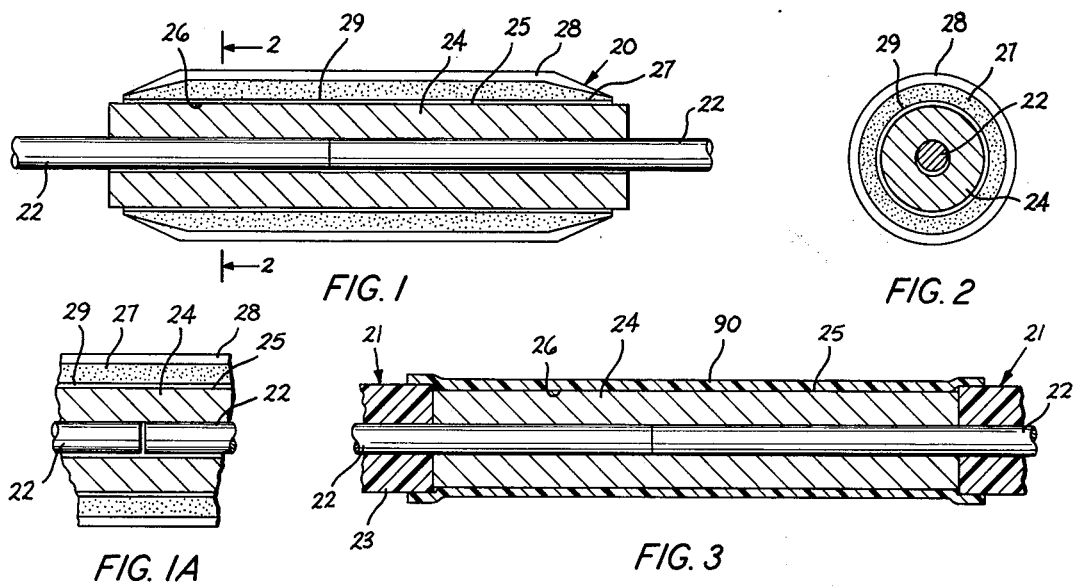
FIG. 1 is an enlarged view in section of a device according to the invention and two wire end portions in coaxial relation.
FIG. 1A is an alternate embodiment of the device of FIG. 1 in which the wire end portions do not abut.
FIG. 2 is a cross-sectional view of the device of FIG. 1 taken along lines 2—2 thereof and shows the wire end portion outer surface nominally spaced from the inner surface of the device.
FIG. 3 is a view in cross-section of a splice between two insulated conductors protected by a heat shrinkable insulating sleeve.

Referring to FIGS. 1 and 2, there is shown a splicing device 20 for joining a pair of wires 22. Device 20 includes a cylindrically shaped ferrule or sleeve 24 comprising a suitable material, e.g., copper or aluminum, which is usually the same material as that comprising wires 22. Ferrule 24 has an internal passage 26 for accommodating wires 22. The outside diameter of ferrule 24 is such as to provide a cross-sectional area equal to or exceeding the cross-sectional area of wire 22, so that electrical and mechanical integrity is maintained. The length of sleeve 24 is not critical and may typically be 0.5 inch.

The exterior surface 25 of ferrule 24 is coated with an explosive coat or layer 27 comprising a suitable primary high explosive composition. For purposes of the present invention, the term "high explosive" is defined as a chemical substance which undergoes a complex, high velocity exothermic reaction, typically having a detonation velocity of from 5,000 f.p.s. to 25,000 f.p.s. and thus exhibiting detonation as opposed to burning or deflagration. A "primary high explosive" or primary explosive, as compared to a "secondary high explosive," is one which may be easily detonated by the application of an electrical discharge, heat, light, pressure, etc., thereto, has an extremely low critical mass for detonation, and is basically a very sensitive material.

Typical suitable explosives are disclosed in U.S. Pat. No. 3,727,296, assigned to the assignee hereof and incorporated by reference hereinto, and include azides of silver, titanium, boron, silicon, copper, cadmium, ammonium and mercury ("-ic" and "-ous"); fulminates of mercury ("-ic" and "-ous"), silver and copper, acetylides of mercury ("-ic" and "-ous"), copper and silver; styphnates of lead and barium; silver nitride, tetrazene and diazodinitrophenol. A particularly useful primary explosive comprises lead azide, which may be used in a finely divided form such as the forms referred to as dextrinated or collodial. Suitable lead azide compositions are disclosed in U.S. Pat. No. 3,704,186, assigned to the assignee hereof and incorporated by reference hereinto.

The amount of explosive employed, and therefore the thickness of explosive layer 27, is dependent upon the materials to be bonded, the particular explosive selected and its detonation velocity, and the nominal spacing between the opposing surfaces of wires 22 and ferrule 24. The opposed ferrule and wire surfaces are referred to as nominally spaced because they will ordinarily be in point or line contact prior to bonding, although a certain nominal or average spacing, e.g., 2 to 6 mils, is provided for; this spacing permits jetting, explained below. These parameters determine the velocity of impact between the surfaces to be bonded upon detonation of explosive layer 27. In order to obtain a good, metallurgical bond, the velocity of impact between these surfaces must be sufficient to create an impact pressure which causes substantial plastic flow to occur within the materials being bonded. The superfical plastic flow deforms the respective contacting surfaces, resulting in a jet comprising material from at least one and preferably both contacted surfaces to spurt out therebetween. This "jetting" phenomenon is important to establishing a strong metallurgical bond, i.e., a wide area intimate union between two metallic materials in which metallic bonding forces extend across the interface therebetween, since it removes impurities and oxides which are present on the respective surfaces and brings freshly exposed, virgin material into intimate contact to bond.

As stated above, a suitable velocity of impact is dependent upon the explosive employed, including the amount and/or layer thickness thereof, the materials to be bonded, and the spatial relationship between the material surfaces, i.e., upon parameters which can be easily determined by one skilled in the art without an undue amount of experimentation. Typically, for example, when using an explosive mixture comprising when wet a 70 weight percent collodial lead azide ($PbN_6$) and 30 weight percent screening medium (a pine oil-ethyl cellulose blend comprising approximately 10% by weight ethyl cellulose) to bond pairs of 0.010 to 0.057 inch diameter aluminum or copper wires 22 to ferrule 24, the ferrule-wire spacing ranges from 2 to 6 mils and the minimum explosive layer thickness is 0.6 times the wall thickness of the ferrule 24 for aluminum and 1.0 times for copper. In this regard, it is to be noted that a suitable impact pressure sufficient to obtain a desirable jetting and good metallurgical bond can be easily determined or calculated by one skilled in the art, as indicated in U.S. Pat. No. 3,727,296, incorporated hereinto by reference.

Explosive layer 27 is of generally uniform thickness over the exterior surface of ferrule 24, but may have a taper at the ends thereof as shown in FIG. 1. Besides coating the ferrule 24 itself, the explosive composition may also be applied to a bobbin (not shown) which is in turn slid over the ferrule. A protective coating 28, such as a 0.5 mil lacquer coating, may be applied over layer 27. A similar coating or layer 29 may be employed to provide chemical insulation between layer 27 and ferrule 24 where layer 27 comprises an explosive, e.g., lead azide, which may interact with the ferrule material to produce undesirable chemical products.

Upon detonation of explosive layer 27 by means of an electrical spark resistance heated filament or the like, the walls of ferrule passageway 26 are progressively driven towards the opposing surfaces of wires 22 with high velocity to create a high-impact pressure sufficient to cause jetting and the formation of a metallurgical bond between ferrule 24 and wires 22, thereby forming a splice such as that illustrated in FIG. 3.

A completed splice is shown in FIG. 3. This figure also illustrates application of the invention to the splicing of insulated conductors 21 comprising conductor wires 22 and insulation 23. Prior to forming the splice, a length of insulation 23 approximately equal to, but which may be slightly less than, one-half the length of the ferrule 24 is removed from the end portion of each insulated conductor 21. When the exposed wires 22 are inserted into ferrule passage 26, the terminal portions of the remaining insulation abut or approximately abut ferrule 24, and thus serve to locate the wire end surfaces within the device 20.

Also shown in FIG. 3 is the use of heat-shrinkable plastic sleeve 90 to form a protective insulating covering over the complete splice. The end portions of sleeve 90 overlap insulation 23 to completely enclose the splice. In practicing the invention, a length of sleeving 90 having an inside diameter greater than the outside diameter of conductor 21 is slid over the end of one of insulated conductors 21. After the splice is formed, the section of sleeving 90 is centered thereover, and heat applied to form a protective sleeve as illustrated in FIG. 3.

Figure 4:
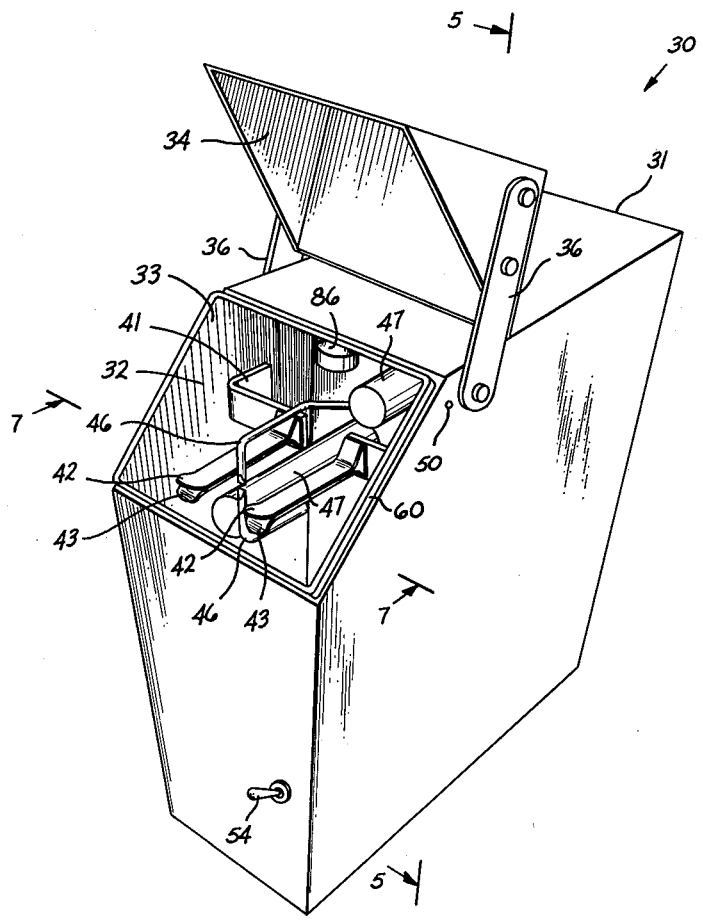
FIG. 4 is a perspective view of apparatus which may be used to carry out the methods of this invention.

FIG. 4 shows apparatus 30 designed to explosively join wires 22 by means of device 20. Apparatus 30 includes an enclosure or chamber 31 having an opening 32. The inner surfaces of the walls of enclosure 31 are lined with a soundabsorbing medium which prevents the operation of apparatus 30 from adding appreciably to ambient noise levels.

Enclosure 31 is provided with a pivotally mounted door 34 extending between two swing bars 36 which are pinned to housing 31. Door 34 is adapted to conform to opening 32 and to complete the enclosure of actuating facilities contained therein. The joint between door 34 and enclosure 31 includes a gasket 60 of resilient material which aids in containing noise and explosion products; the gasket also serves to hold wires 22 or conductors 21 (see FIG. 7) and creates seals thereabout. Moreover, enclosure 31 is provided with a safety interlock 50 (also indicated schematically as switch 50 in the circuit 52 of FIG. 6) which prevents energization of electrodes 46 unless door 34 is closed.

Figure 5:
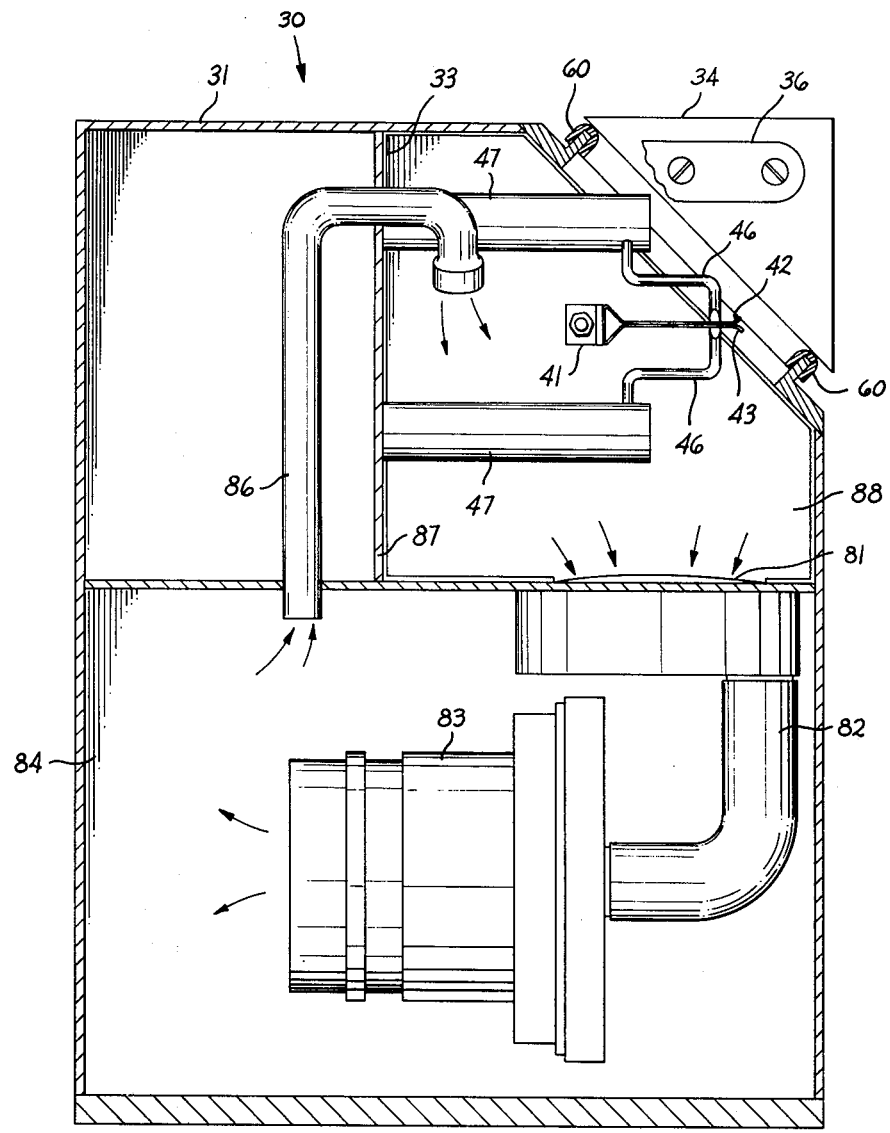
FIG. 5 is a sectional view of the apparatus of FIG. 4 and taken along lines 5—5 thereof.

Enclosure 31 also includes facilities for holding the splice assembly comprising device 20 and wires 22 or conductors 21 in position for joining. Referring now to FIGS. 4 and 5, there is shown a bracket 41 joined to and extending from each side wall of enclosure 31. Depending from a free end of each bracket 41 is a pair of spring fingers 42-43 for gripping and holding wires 22 or conductors 21. Each set of fingers 42-43 is contoured to form a tapered opening to facilitate the insertion of a wire 22 or conductor 21. The holding portions of spring finger pairs 42-43 are biased into engagement with each other.

Apparatus 30 also includes facilities for initiating the detonation of explosive layer 27 of device 20. The facilities for causing the detonation include a pair of electrodes 46 which may be of copper but are preferably of stainless steel for longer life. Electrodes 46 are mounted with the free ends thereof aligned opposite one another and spaced to receive device 20 therebetween. The spacing between electrodes 46 is such that a detonation spark will cross the defined gaps to device 20.

Figure 6:
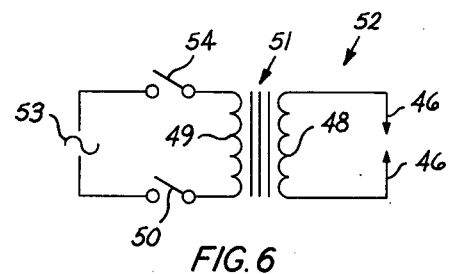
FIG. 6 is a schematic view of an electrical circuit which may be used in the operation of the apparatus of FIG. 4.
Figure 7:
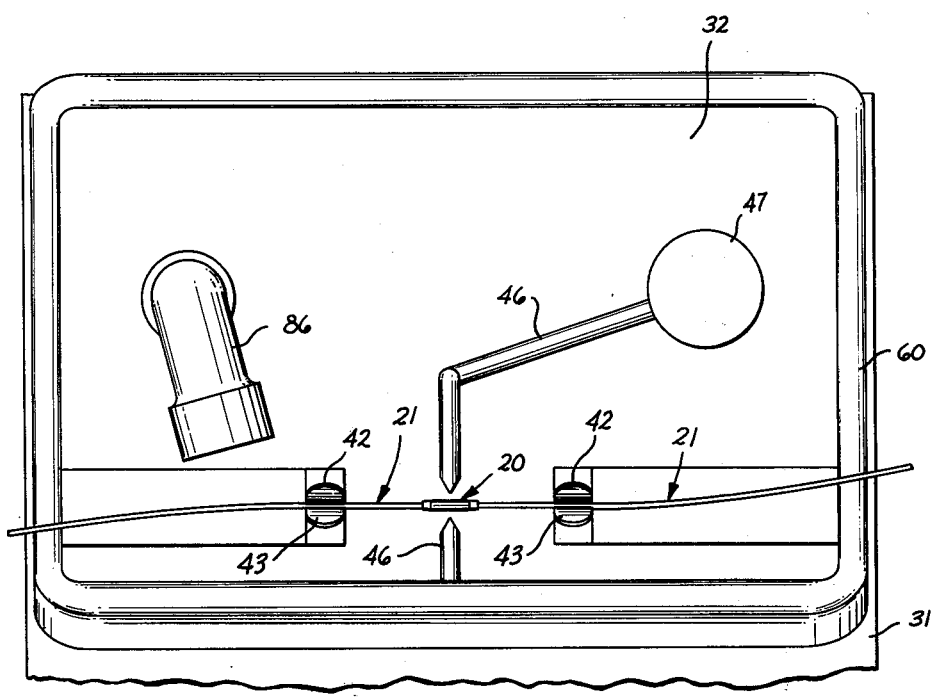
FIG. 7 is a view taken along lines 7—7 of FIG. 4 showing a two wire and ferrule assembly in position for explosive joining.

Each electrode 46 is physically supported from a member 47 as shown in FIG. 4. Further, each electrode 46 is connected electrically to one side of the secondary winding 48 of a transformer 51 having a primary winding 49 which comprises part of a circuit 52 as shown in FIG. 6. Transformer 51 is connected to a voltage source 53, e.g., 110 volts, via toggle detonation switch 54 and interlock switch 50. With switches 54 and 50 closed, a suitable detonating voltage, e.g., 3000 volts, appears across electrodes 46.

Referring to FIG. 5, it should be noted that detonation of explosive layer 27, comprising, e.g., a lead azide mixture, will cause some gaseous and particulate explosion products to be dispersed into the atmosphere of enclosure 31. A filter 81 is provided in chamber 31, connected to a conduit 82, which in turn is connected to an evacuation device 83. Evacuation device 83, e.g., a vacuum motor, empties to the rear portion 84 of enclosure 31 which is connected via conduit 86 through wall 87 back into the enclosure operational section 88. Explosion products from the vicinity of electrodes 46 are drawn into this recirculating evacuation system, and the particulate matter removed by filter 81, after each explosive detonation.

It will be evident that a container or cartridge for devices 20 may be affixed to apparatus 30 in order to facilitate the formation of splice assemblies for insertion between electrodes 46.

In carrying out the principles of the method of this invention, the end portions of wires 22 are inserted in device 20 to form a splice assembly which is moved as a unit into enclosure 31. If insulated conductors 21 are being joined, a length of insulation equal to approximately one half the length of device 20 will be stripped from the end portion of each prior to insertion. Also, if a protective sleeve is desired over the completed splice, a length of heat shrinkable sleeving 90 will be slipped over the end of one of the wires 22 or conductors 21 prior to forming the splice assembly. Device 20 is then positioned between electrodes 46 so that the free ends of the electrodes are approximately aligned with the center of the device 20 and spaced within sparking distance thereof, e.g., less than 1/16 inch total gap width for 3000 volts across electrodes 46. Then door 34 is secured to complete the closing of enclosure 31 as well as form a seal about wires 21 or conductors 22 at gasket 60. Toggle switch 54 is then depressed to initiate the detonation of explosive layer 27.

The spark between electrodes 46 impinges on the approximate center of device 20 to detonate explosive layer 27 at that point, causing ferrule 24 to progressively accelerate toward and collide with wires 22. The colliding surfaces are plastically deformed, behaving very briefly as non-viscous fluids, and jetting occurs. This jetting purges the surfaces of contaminants and the remaining ultra-clean or nascent materials form a metallurgical bond. If heat shrinkable sleeving had been previously provided over one of the members joined, it may now be centered over the completed splice and shrunk to form a protective covering 90 as illustrated in FIG. 3.

It has been found that best results are obtained if detonation is initiated at the center of ferrule 24. Also, a bond along the entire length of ferrule 24 is not required to obtain adequate tensile strength in the resulting splice. For example, it has been found that with a half inch long ferrule, joining 22 gauge wires, a bond length of 1/16 inch with each wire end portion is sufficient. Also, it will be noted that the end of wires 22 need not abut within device 20, as may be seen by comparing FIGS. 1 and 1A.

An important characteristic of the present invention concerns the nature of the bond which secures ferrule 24 to each wire 22. This bond is a substantially uninterrupted metal-to-metal bond over the opposing metal surfaces, and is significantly superior to a mechanical bond.

Generally, splices formed in accordance with the principles of this invention will be stronger than the wire members joined. A surprising feature of the present invention is that a continuous metallurgical bond is formed joining ferrule 24 and wires 22.

EXAMPLE I

A plurality of copper ferrules ½ inch in length were fabricated. An explosive slurry was applied to the exterior surfaces of the ferrules using a squeegee and shouldered spacers to control the thickness of the resultant explosive layer. The slurry comprised 70% by weight colloidal lead azide ($PbN_6$) and 30% by weight of a screening medium comprising a pine oil-ethyl cellulose blend of approximately 10% by weight ethyl cellulose. The ferrules were dried in a circulating oven at 150° F. for one hour. The explosive density of the resultant dried composition, comprising about 94 weight percent lead azide, was about 2 g/cc. The thickness of the explosive layer was 1.3 ± 25% times the thickness of the ferrule wall. The detonation velocities of the dried explosive composition used were about 10,800 ft/sec. for 10 mil thickness, 11,400 ft/sec. for 15 mil thickness, 11,800 ft/sec. for 20 mil thickness, 12,300 ft/sec. for 25 mil thickness, and 12,500 ft/sec. for 30 mil thickness. Pairs of copper wires to be spliced, ranging from 0.010 inch to 0.057 inch in diameter were inserted into the ferrules approximately half way from each end thereof. Some conductors were butted, others were not. The explosive layers were detonated by means of a resistance heated filament to effect splicing of the wires.

The resultant splices were pull-tested to failure. The breaking load was compared to that of the original wires. The data obtained are reported in Table I and they indicate the splices to be stronger than the wires in almost all cases. Only the 10 mil copper wires failed

EXAMPLE IV

The splicing procedure of Example I was repeated except that pairs of steel wires were spliced using brass ferrules. The pull-test data are reported in Table I.

TABLE I

MECHANICAL TEST RESULTS OF HIGH ENERGY SPLICED ALUMINUM, COPPER, BERYLLIUM COPPER, AND STEEL WIRES

| TYPE WIRE | WIRE DIA. (MILS) | SLEEVE I.D. (MILS) | SLEEVE O.D. BEFORE (MILS) | SLEEVE O.D. AFTER (MILS) | AVG. WIRE SPLICE BREAKING FORCE (LBS.) | BREAKING FORCE (LBS.) | MODE OF FAILURE |
|---|---|---|---|---|---|---|---|
| Cu | 39 | 41 | 74 | 73 | 44.4 | 44.8 | WF |
| Cu | 39 | 41 | 74 | 72 | 44.4 | 44.6 | WF |
| Cu | 39 | 41 | 74 | 72 | 44.4 | 44.8 | WF |
| Cu | 39 | 41 | 74 | 72 | 44.4 | 44.6 | WF |
| Cu | 39 | 41 | 74 | 73 | 44.4 | 44.6 | WF |
| Cu | 39 | 41 | 74 | 72 | 44.4 | 44.8 | WF |
| Cu | 30 | 32 | 62 | 60 | 29.7 | 29.4 | WF |
| Cu | 30 | 32 | 62 | 60 | 29.7 | 30.1 | WF |
| Cu | 30 | 32 | 62 | 60 | 29.7 | 30.1 | WF |
| Cu | 30 | 32 | 62 | 60 | 29.7 | 30.1 | WF |
| Cu | 30 | 32 | 62 | 60 | 29.7 | 30.1 | WF |
| Cu | 30 | 32 | 62 | 60 | 29.7 | 29.9 | WF |
| BeCu | 25 | 29 | 54 | 51 | 34.7 | 34.9 | WF |
| BeCu | 25 | 29 | 54 | 51 | 34.7 | 34.7 | WF |
| BeCu | 25 | 29 | 54 | 51 | 34.7 | 34.5 | WF |
| BeCu | 25 | 29 | 54 | 51 | 34.7 | 34.5 | WF |
| BeCu | 25 | 29 | 54 | 52 | 34.7 | 34.7 | WF |
| BeCu | 25 | 29 | 54 | 51 | 34.7 | 34.5 | WF |
| Cu | 10 | 18 | 38 | 31 | 4.8 | 3.3 | WF |
| Cu | 10 | 18 | 35 | 31 | 4.8 | 3.5 | WF |
| Al | 30 | 32 | 54 | — | 7.3 | 7.1 | WF |
| Al | 30 | 32 | 54 | — | 7.3 | 7.0 | WF |
| Steel | 39 | 52 | 85 | 77–78 | 238 | 237 | WF |
| Steel | 39 | 52 | 85 | — | 238 | 237 | WF |
| Steel | 39 | 52 | 85 | 75–78 | 238 | 237 | WF |
| Steel | 39 | 47 | 85 | 80 | 238 | 237 | WF |
| Steel | 39 | 47 | 85 | — | 238 | 237 | WF |
| Cu | 57 | 61 | 100 | 97–99 | 85.8 | 82.5 | WF |
| Cu | 57 | 61 | 100 | 98 | 85.8 | 84.7 | WF |
| Cu | 57 | 61 | 100 | — | 85.8 | 86.9 | WF |
| Cu | 57 | 61 | 119 | 116–118 | 85.8 | 80.3 | WF |
| Cu | 57 | 61 | 119 | 114–116 | 85.8 | 77 | WF |
| Cu | 57 | 63 | 100 | 94–95 | 85.8 | 85.8 | WF |
| Cu | 57 | 63 | 100 | 94–95 | 85.8 | 84.7 | WF |
| Cu | 57 | 63 | 119 | 115–116 | 85.8 | 88 | WF |
| Cu | 57 | 63 | 119 | 117 | 85.8 | 77 | WF |

Instron Model-TM tensile testing machine used for strength measurements.
WF - Wire failure, a separation of the wire and not the splice.
The sleeve material for Cu and BeCu wire was Cu, for Al wire was Al, and for steel wire was brass.

adjacent the splice, due, it is believed, to improper fixturing permitting deflection upon detonation.

Resistance measurements were made across a unit length of wires before and after splicing in order to determine the electrical characteristics of the splice. There was no increase in electrical resistance due to the resultant bond interface.

The splices were examined metallographically using conventional techniques to study the nature of the resultant bond. True metallurgical bonds were observed.

EXAMPLE II

The procedure of Example I was repeated except that pairs of aluminum wires (0.030 inch in diameter) were spliced using aluminum ferrules. The pull-test data obtained are reported in Table I.

The resistance and metallographic examinations were similar to those obtained for copper wires.

EXAMPLE III

The splicing procedure of Example I was repeated except that pairs of beryllium-copper wires (0.025 inch diameter) were spliced using copper ferrules. The pull-test data are reported in Table I.

It is to be understood that the above-described embodiments are simply illustrative of the principles of the invention. Various other modifications and changes which will embody the principles of the invention and fall within the spirit and scope thereof may be made by those skilled in the art. For example, the invention is obviously applicable to joining thick-walled tubular members or wire-like members of other than circular cross section. Further, the generally cylindrical ferrule 24 could be shaped in cross section to match the shape of the members to be joined.

What is claimed is:

1. A method of joining first and second wire-like metallic members, comprising:
   coating a substantial portion of the exterior surface of a hollow metallic member with a primary explosive composition;
   juxtaposing the end portions of the first and the second members in approximate coaxial alignment within said hollow metallic member; and
   detonating said primary explosive composition to propel and impact said hollow member against said aligned first and second members at a velocity of impact sufficient to spurt a jet of material, comprising at least one member surface, between said impacted hollow member and said impacted first and second members, respectively, to form metallurgical bonds therewith to indirectly join said aligned first and second members.

2. The method of claim 1, in which:
said first, second and hollow members comprise the same material.

3. The method of claim 1, in which:
said first and second members are insulated conductor wires, said method further comprising, between said coating and juxtaposing steps,
stripping the insulation from the end portions of said conductor wires.

4. The method of claim 3, in which said juxtaposing step further comprises:
inserting said conductor wires into said hollow member until the remaining insulation abuts said hollow member.

5. A method of joining a metallic wire member to another metallic wire member comprising the steps of:
juxtaposing within a ferrule corresponding first surfaces of said members with one another and juxtaposing within said ferrule corresponding second surfaces, adjacent said first surfaces, with one face of said ferrule having a coating comprising a primary explosive on the opposite face thereof; and
detonating said primary explosive to propel said one ferrule face against said second surfaces to spurt a jet of material, comprising at least said second surfaces or said face, from between said propelled ferrule face and each of said propelled-against second surfaces to form metallurgical bonds between said ferrule and said members to indirectly join said members by not forming a metallurgical bond therebetween.

6. The method of claim 5, in which:
said ferrule and said members comprise the same material.

7. A method of joining an end portion of one conductor wire to an end portion of another conductor wire adjacent to and held in approximate coaxial alignment with the one conductor wire, comprising the step of:
inserting the end portions of the conductor wires into a ferrule coated on an exterior surface thereof with a layer comprising a primary explosive composition and having an opening therethrough concentric with and slightly larger in cross-section than the end portions, and
detonating the primary explosive composition to impact said ferrule against the end portions at a velocity of impact sufficient to form substantially a solid phase bond between the end portions and the ferrule to indirectly join the end portions without forming a metallurgical bond therebetween.

8. The method of claim 7, in which the ferrule and the conductor wires comprise the same material.

9. The method of claim 7, in which the conductor wires normally comprise an insulation layer, comprising, prior to the inserting step:
removing the insulation layer from the end portions of the conductor wires.

10. The method of claim 9, in which the total length of insulation layer removed from the two conductor wires is equal to or slightly less than the length of the ferrule.

11. The method of claim 7 further comprising, prior to the inserting step:
placing a length of shrinkable sleeving over one of said conductor wires; and, subsequent to said detonating step,
positioning said sleeving over said ferrule, and
shrinking said sleeving.

12. A method of joining first and second wire-like metallic members, comprising:
juxtaposing the end portions of said members in approximate coaxial alignment within a third, hollow metallic member; and
detonating a primary explosive composition placed contiguous to said third member to propel said third member against said aligned first and second members with an impact velocity sufficient to form metallurgical bonds therewith.

* * * * *

UNITED STATES PATENT OFFICE
CERTIFICATE OF CORRECTION

Patent No. 4,057,187    Dated November 8, 1977

Inventor(s) B. H. Cranston, G. E. Kleinedler, D. A. Machusak and C. A. Wiechard

It is certified that error appears in the above-identified patent and that said Letters Patent are hereby corrected as shown below:

In the specification, Column 1, line 45, "wirejoining" should read --wire-joining--; line 61, "section" should read --sectional--. Column 2, line 10, "splice proximate" should read --splice assembly proximate--. Column 4, line 46, "complete" should read --completed--; line 59, "soundabsorbing" should read --sound-absorbing--.

In the claims, Column 9, claim 7, line 41, "step" should read --steps--.

Signed and Sealed this

Twenty-fourth Day of May 1983

[SEAL]

*Attest:*

DONALD J. QUIGG

*Attesting Officer*    *Acting Commissioner of Patents and Trademarks*